UNITED STATES PATENT OFFICE.

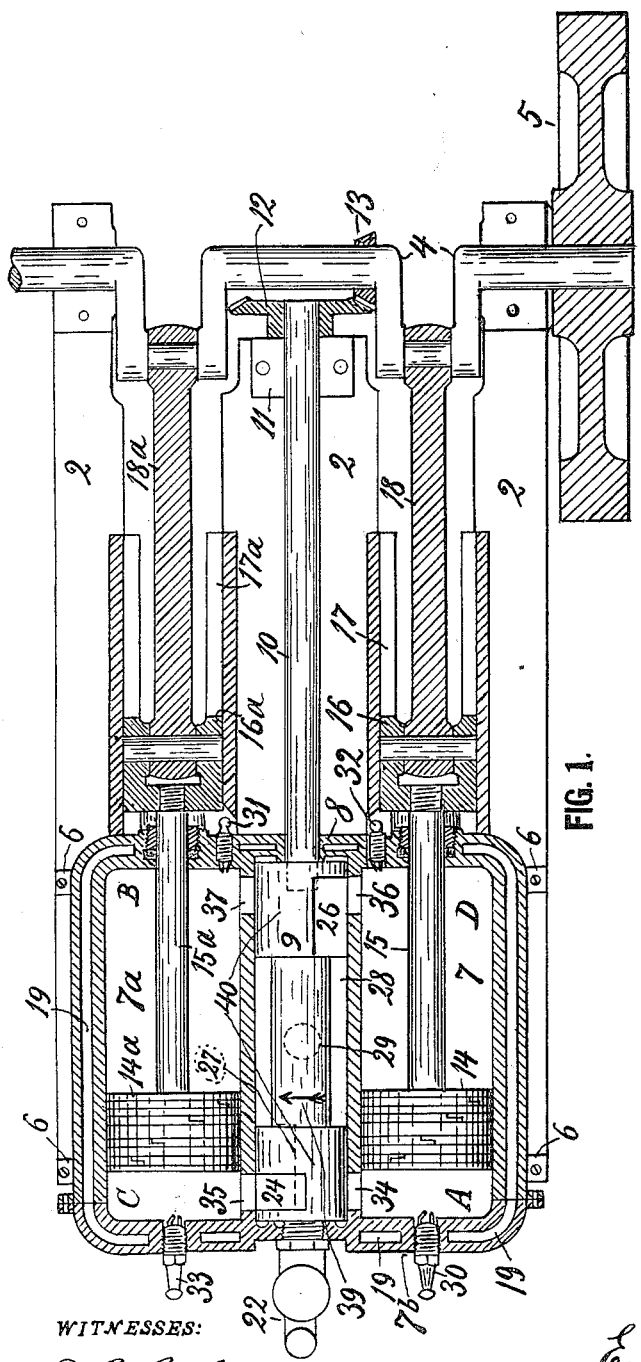

ERNEST S. REILAND, OF ST. PAUL, MINNESOTA.

EXPLOSIVE-ENGINE AND VALVE-GEAR FOR SAME.

1,060,629. Specification of Letters Patent. Patented May 6, 1913.

Application filed October 30, 1912. Serial No. 728,701.

*To all whom it may concern:*

Be it known that I, ERNEST S. REILAND, a citizen of the United States, residing at St. Paul, in the county of Ramsey and State of Minnesota, have invented a new and useful Explosive-Engine and Valve-Gear for Same, of which the following is a specification.

My invention relates to improvements in explosive engines, especially gasolene engines; and the object is to provide such an engine with a cheap, simple but effective valve and valve mechanism by which explosions at both sides of each cylinder piston is secured, and thus a two-cylinder engine may be made as efficient as a four-cylinder one arranged for explosions only at one side of each piston.

Figure 3:
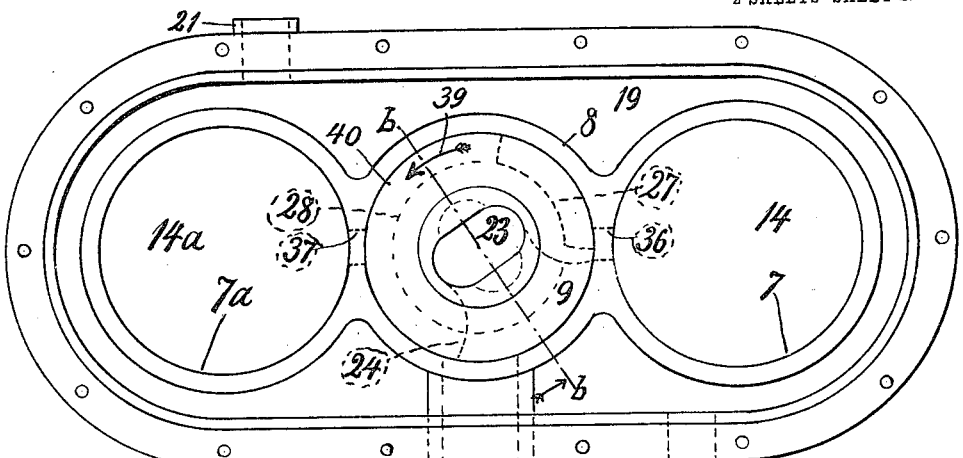
Figure 4:
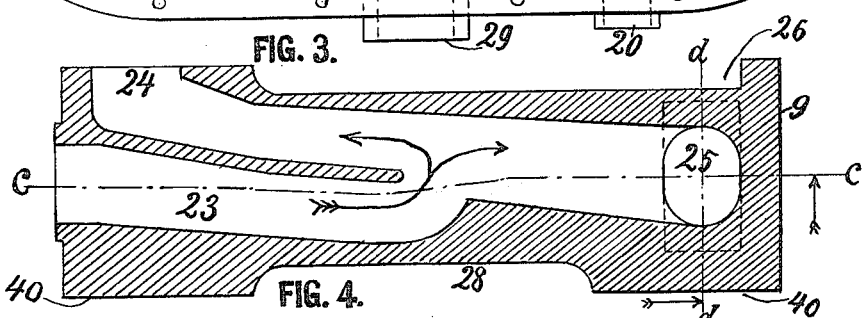
Figure 5:
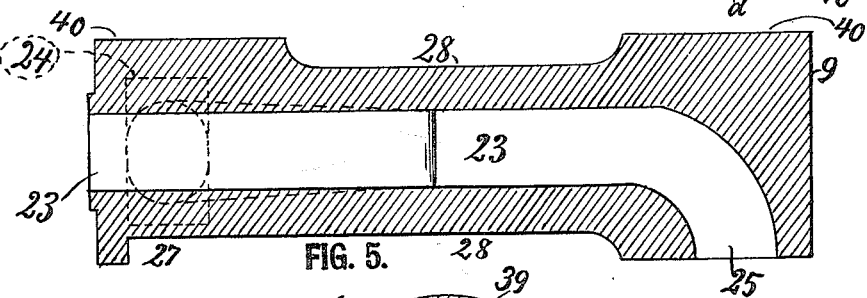
Figure 6:
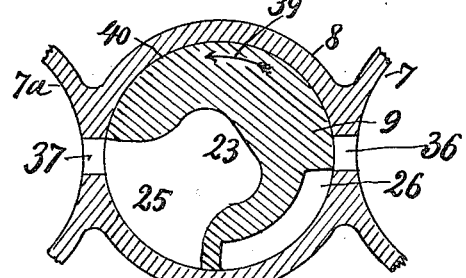

In the accompanying drawings, Figure 1 is a partly sectional plan view on the line $a$—$a$ Fig. 2 of a horizontally disposed explosive engine embodying my invention. Fig. 2 is a side elevation of said engine with the fly-wheel and the carbureter omitted. Fig. 3 is an enlarged left hand end view of the cylinders, pistons and valve shown in Fig. 1, with the head plate $7^b$ of said end removed. Fig. 4 is a longitudinal central section of the valve plug of the engine, on the line $b$—$b$ Fig. 3. Fig. 5 is a section on the line $c$—$c$ Fig. 4 of said valve plug. Fig. 6 is a transverse section of the valve plug on the line $d$—$d$ Fig. 4 and the adjacent portion of the valve chamber and the cylinders intersected at the same line.

Referring to the drawings by reference numerals and letters, the line 1 in Fig. 2 designates any base or frame-work upon which the bed-plate or frame 2 may have its lugs 3 secured by bolts (not shown). Journaled upon one end of the frame is a crank shaft 4 having at one end fixed a fly-wheel 5 and at the other end a sprocket wheel or any other suitable means (not shown) for transmitting power from the shaft when the latter rotates. Upon the other end of the frame is secured the lugs 6 of a pair of cylinders 7 and $7^a$, which are connected together by an intermediate cylindrical valve chamber 8. In said valve chamber is fitted to rotate a cylindrical valve plug 9, whose stem 10 is journaled in a bearing 11 and provided with a bevel gear 12, which is rotated by a smaller bevel gear 13, only half the size of the driven gear, fixed on the crank shaft.

In each cylinder is provided a piston 14, or $14^a$, having a piston rod 15, or $15^a$, with a cross-head 16, or $16^a$, guided by gibs 17, $17^a$, which may be mounted either upon the frame or upon the front ends of the cylinders. From each cross-head extends a pitman 18, or $18^a$, to one of the cranks of the crank-shaft. Said cranks stand both in the same radial direction of the shaft.

19 designates the usual space for cooling water to circulate about the cylinders and the valve chamber, the water entering the space at 20 and leaving it at 21, or vice versa. (See Fig. 3.)

In Fig. 1 22 designates the carbureter, which is mounted at the rear end of the valve chamber so as to supply explosive fuel into the longitudinal central passage 23 of the valve plug (shown in Figs. 3 to 6). Said passage terminates in two lateral fuel inlet ports 24 and 25, one near each end of the plug and arranged in radial direction of the plug about ninety degrees apart. In peripheral lines with the said fuel ports 24 and 25 the plug is also provided with two exhaust ports 26 and 27, each arranged to move just ahead of the fuel-delivering port, so as to permit the dead gas to escape from the cylinder just before the fuel gas is admitted. Said exhaust ports are united by a cylindrical space 28 formed about the middle of the plug and communicating at all times with a main exhaust port 29, which latter may have a muffler, (not shown).

In Fig. 1 30, 31, 32 and 33 show the spark plugs arranged one in each end of the cylinders and connected with electric wires (not shown).

In peripheral line with the ports 24 and 27 of the valve plug the rear end of the cylinder 7 is provided with a port 34, and the cylinder $7^a$ with a port 35; the front ends of the cylinders are each provided with similar ports 36, 37 in peripheral line with the ports 25 and 26 of the adjacent end of the valve plug.

To facilitate the explanation of the operation of the engine, I have marked the explosion chambers or spaces in the cylinders, A, B, C and D. I will also call attention to the facts that the valve plug rotates only half as fast as the crank shaft, and that each end portion of the valve plug has a semicylindrical portion or solid face 40, half of which closes the cylinder port during the compression of the fuel gas therein, and the other half keeps the said port closed during the explosion and its action on the piston;

and then comes the port 26, or 27, to permit the dead gas to escape, and then comes the port 24, or 25, and admits fuel gas into the cylinder. In the present instance the engine is arranged to rotate in the direction of the arrow 38 in Fig. 2, with the valve plug rotating in the direction of the arrow 39 in Fig. 1. Now, supposing that by turning the fly-wheel, or by any of the other usual means for starting this class of engines, fuel gas has been compressed at A and uncompressed fuel gas fills the space B and the gas at A be exploded, being ignited by any of the usual mechanisms (not shown) arranged between the engine and the spark plugs, successive explosions will then follow in the order A, B, C, D; A, B &c.; and after each explosion the dead gas left from the explosion will be expelled by the pistons, and fuel gas drawn into the cylinders and compressed by the pistons in the very same rotation, A, B, C, D; A, B &c., so that the two cranks act as one crank, and the two pistons act as one double-acting piston, actuated in one direction by pressure at the piston face nearest A, and in the opposite direction by pressure at B; then by pressure at C, then at D, &c.

What I claim is:—

In an explosion engine, the combination with a frame, of a shaft journaled therein and having two cranks arranged in the same radial plane, a cylindrical valve chamber, a valve plug rotatable therein and having a stem extending toward the crank shaft, a bevel gear fixed on the crank-shaft and a bevel gear twice as large meshing therewith and fixed on the valve stem; two cylinders arranged one at each side of the valve chamber and having near their ends ports entering the valve chamber, a piston in each cylinder, a piston rod extending from each piston, a guided cross-head at the end of each piston rod, and a pitman connecting each cross-head with one of the cranks; said valve chamber having at one end a fuel intake and at one side an exhaust opening, and the valve plug therein having a central passage communicating with the fuel intake and terminating in two fuel-delivering ports, one near each end of the plug in peripheral line with the cylinder ports; said ports in the plug being arranged radially at right angles; said plug also having near its middle a peripheral recess forming a space which at all times communicates with the main exhaust port of the valve chamber; said recess having longitudinal extensions arranged one slightly in front of each fuel-delivering port in the plug, and means in both ends of each cylinder for igniting the fuel.

In testimony whereof I affix my signature, in presence of two witnesses.

ERNEST S. REILAND.

Witnesses:
A. M. CARLSEN,
HAROLD HARRIS.

---

Copies of this patent may be obtained for five cents each, by addressing the "Commissioner of Patents, Washington, D. C."